United States Patent [19]

Niederman

[11] Patent Number: 5,730,460
[45] Date of Patent: Mar. 24, 1998

[54] AIR BAG COVER

[75] Inventor: Robert Raymond Niederman, Dayton, Ohio

[73] Assignee: General Motors Corporation, Detroit, Mich.

[21] Appl. No.: 755,066

[22] Filed: Nov. 22, 1996

[51] Int. Cl.⁶ ............................................. B60R 21/16
[52] U.S. Cl. ................................. 280/731; 280/728.3
[58] Field of Search ............................ 280/728.3, 731, 280/728.1, 732

[56] References Cited

U.S. PATENT DOCUMENTS

| | | | |
|---|---|---|---|
| 3,853,334 | 12/1974 | Auman et al. | 280/731 |
| 4,148,503 | 4/1979 | Shiratori et al. | 280/731 |
| 4,995,638 | 2/1991 | Shinto et al. | 280/731 |
| 5,152,548 | 10/1992 | Zushi | 280/728.1 |
| 5,305,655 | 4/1994 | Kaga | 74/552 |
| 5,431,438 | 7/1995 | Manabe | 280/731 |
| 5,542,694 | 8/1996 | Davis | 280/728.3 |
| 5,577,768 | 11/1996 | Tagachi et al. | 280/731 X |
| 5,584,500 | 12/1996 | Nemoto | 280/731 X |
| 5,630,614 | 5/1997 | Conlec et al. | 280/731 X |

FOREIGN PATENT DOCUMENTS

| | | | |
|---|---|---|---|
| 241856 | 9/1990 | Japan | 280/728.3 |
| 4095547 | 3/1992 | Japan | 280/728.3 |
| 4231233 | 8/1992 | Japan | 280/731 |
| 6144142 | 5/1994 | Japan | 280/731 |

Primary Examiner—Christopher P. Ellis
Attorney, Agent, or Firm—Kathryn A. Marra

[57] ABSTRACT

A steering wheel and air bag module assembly includes a steering wheel having a hub portion and a rim portion and a plurality of spoke portions connecting the hub portion to the rim portion. An air bag module is mounted to the hub portion and includes an air bag cover having a generally planar top surface. The top surface of the cover includes first, second, and third weakened portions defining a single Y-shaped tear pattern substantially covering the top surface of the cover. The air bag cover preferably has a generally planar top surface and generally vertical side portions extending generally downward from the top surface. The air bag cover includes a plurality of primary flap portions located substantially on the top surface and a plurality of secondary flap portions located substantially on the side portions. Advantageously, the primary and secondary flap portions and the Y-shaped tear pattern cooperatively provide an enlarged opening for air bag deployment.

12 Claims, 3 Drawing Sheets

AIR BAG COVER

TECHNICAL FIELD

This invention relates to an air bag module, and more particularly to an air bag cover having a tear pattern.

BACKGROUND OF THE INVENTION

It is well known in motor vehicles to provide a driver's side air bag module which is mounted to a steering wheel. The air bag module typically includes a base plate and an inflator mounted to the base plate for generating gas to inflate an air bag folded atop the inflator. The module also typically includes a cover covering the air bag and inflator and having hinged flaps formed by weakened portions in the cover. Upon air bag deployment, the air bag forces open the flaps and deploys out through an opening formed in the cover.

Typically, the air bag module is mounted on a central hub portion of the steering wheel. The steering wheel typically includes a circular rim portion with either two or four spoke portions extending between the rim portion and the hub portion. The typical driver's side module has a generally rectangular shape and accordingly, a generally rectangular base plate and air bag cover. Many tear patterns have been developed in connection with the rectangular air bag modules with two or four spoke steering wheels. Typical tear patterns include I-shaped or H-shaped tear patterns which provide two generally rectangular flap portions which open generally up and down or left and right upon air bag deployment. In addition, it is also known to provide a generally round air bag cover which has a plurality of triangular pie-shaped flap portions joined at the center of the cover.

It is also known in the prior art to provide a triangular-shaped air bag cover for use with a steering wheel having three spokes. The triangular-shaped air bag covers typically employ the same types of tear patterns which are used in conjunction with the rectangular or round air bag covers.

SUMMARY OF THE INVENTION

This invention offers advantages and alternatives over the prior art by providing an alternate tear pattern for use with an air bag cover. Preferably, the air bag cover is triangular and is used with a three-spoke steering wheel having a generally triangular-shaped air bag module. Advantageously, the tear pattern is made to complement the triangular-shaped air bag cover and the three spoke steering wheel. Advantageously, the cover preferably includes both primary and secondary flap portions which assist the air bag in expanding laterally outward during deployment. Advantageously, the tear pattern provides an enlarged deployment opening through which the air bag can deploy.

These advantages are accomplished in a preferred form of the invention by providing a vehicle steering wheel and air bag module assembly with the assembly having an inflatable air bag for deployment. The assembly includes a steering wheel having a hub portion and a rim portion and a plurality of spoke portions connecting the hub portion to the rim portion. An air bag module is mounted to the hub portion and includes an air bag cover having a generally planar top surface. The top surface of the cover includes first, second, and third weakened portions defining a single Y-shaped tear pattern substantially covering the top surface of the cover. The Y-shaped tear pattern advantageously provides an enlarged opening which complements the preferably triangular shape of the cover. The top surface preferably includes a generally central point and the weakened portions forming the Y-shaped tear pattern each intersect at the generally central point on the top surface of the cover. The assembly preferably includes first, second, and third spoke portions and the first, second, and third weakened portions are positioned between the spoke portions and extend radially inward to intersect at the generally central point. The cover preferably includes three flap portions on the top surface defined by the Y-shaped tear pattern and each of the flap portions has a generally pentagonal shape.

In accordance with other preferred aspects of the invention, the air bag cover has a generally planar top surface and generally vertical side portions extending generally downward from the top surface. The air bag cover includes a plurality of primary flap portions located substantially on the top surface and a plurality of secondary flap portions located substantially on the side portions. The primary and secondary flap portions are movable from a closed condition to an open condition upon air bag deployment. Advantageously, the primary and secondary flap portions cooperatively provide an enlarged opening for air bag deployment.

Preferably, the primary flap portions each include a base edge about which the primary flap portions are hinged open during air bag deployment and the primary flap portions include weakened portions which cooperatively form a Y-shaped tear pattern on the top surface of the air bag cover. Preferably, the top surface of the cover includes a generally central point thereon and the weakened portions forming the Y-shaped tear pattern converge to intersect at the generally center point. Also preferably, the secondary flap portions are positioned between the respective spoke portions to permit outward lateral expansion of the air bag during deployment. Preferably, each of the primary flap portions include a base edge about which the primary flap portions hinge open and the secondary flap portions are each positioned between the base edges of the primary flap portions.

In a preferred form of the invention, there are exactly three primary flap portions and the steering wheel includes exactly three spoke portions and at least one secondary flap portion is located between each of the spoke portions. Also preferably, the primary flap portions each include a base edge about which the flap portions hinge open, the base edges each being adjacent and radially aligned with the respective spoke portions to complement the preferably triangular shape of the cover.

Each of the primary flap portions may have a generally pentagonal shape. Each of the primary flap portions preferably include a first pair of breakable side edges extending away from the base edges and diverging away from each other a second pair of breakable side edges extending away from the first pair of side edges and converging towards each other and intersecting at a generally central point on the top surface of the cover.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
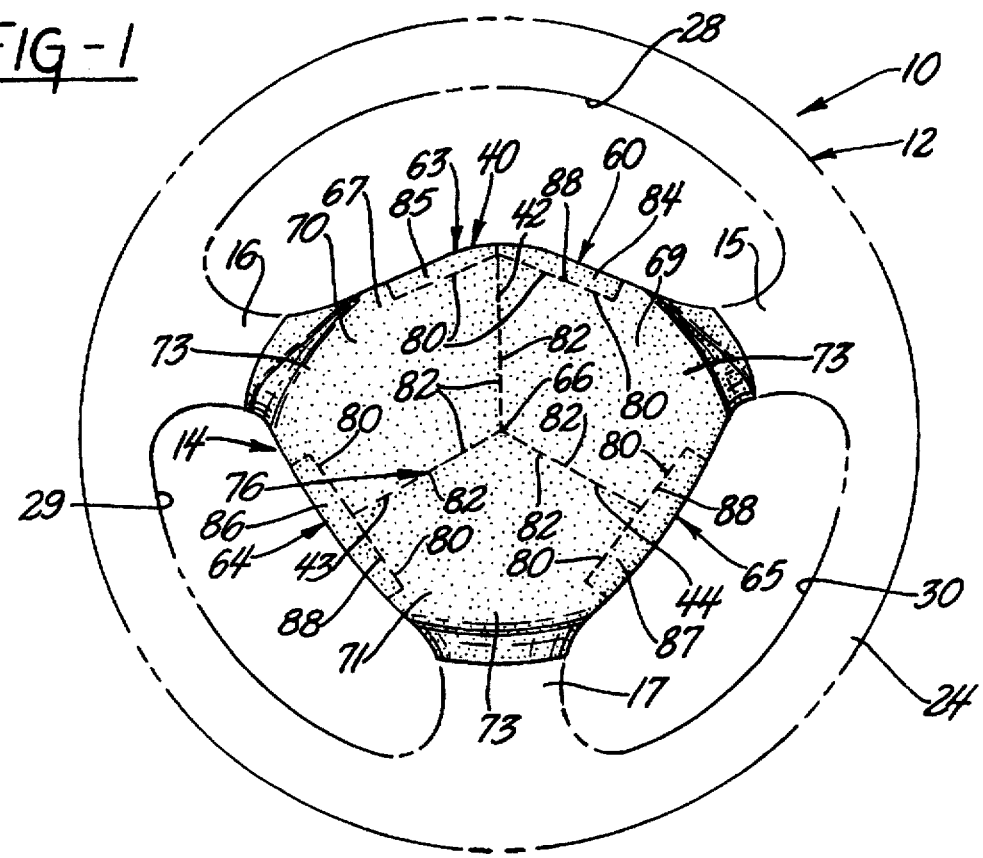
FIG. 1 is a plan view of a vehicle steering wheel and air bag module assembly including an air bag cover.

Referring to FIG. 1, it is seen that a vehicle steering wheel and air bag module assembly, generally designated as 10, includes an air bag module 40 suitably mounted on a central hub portion 14 of a vehicle steering wheel 12. The vehicle steering wheel 12 also includes a circular steering wheel rim portion 24 connected to the hub portion 14 by first, second and third spoke portions, 15, 16, 17, respectively, extending therebetween, as best shown in FIG. 1. Preferably, the steering wheel 12 includes first, second and third side spaces 28, 29, 30, respectively, defined between the hub portion 14 and the rim portion 24 and separated by the spoke portions 15, 16, 17. More specifically, the first side space 28 is located between the first and second spoke portions 15, 16, the second side space 29 is located between the second and third spoke portions 16, 17, and the third side space 30 is located between the third and first spoke portions 17, 15.

The air bag module 40 is mounted to the hub portion 14 of the vehicle steering wheel 12 and includes a generally triangular base plate (not shown), made of a rigid material. The air bag module 40 also includes an inflator (not shown) for generating inflator gas upon the sensing of predetermined vehicle conditions. The inflator may be of any conventional construction. The air bag module 40 further includes an air bag (not shown) made of a fabric material and connected to the base plate as is well known in the art. Upon the sensing of predetermined vehicle conditions, the air bag is inflated by gas discharged by the inflator in a well known manner.

Figure 7:
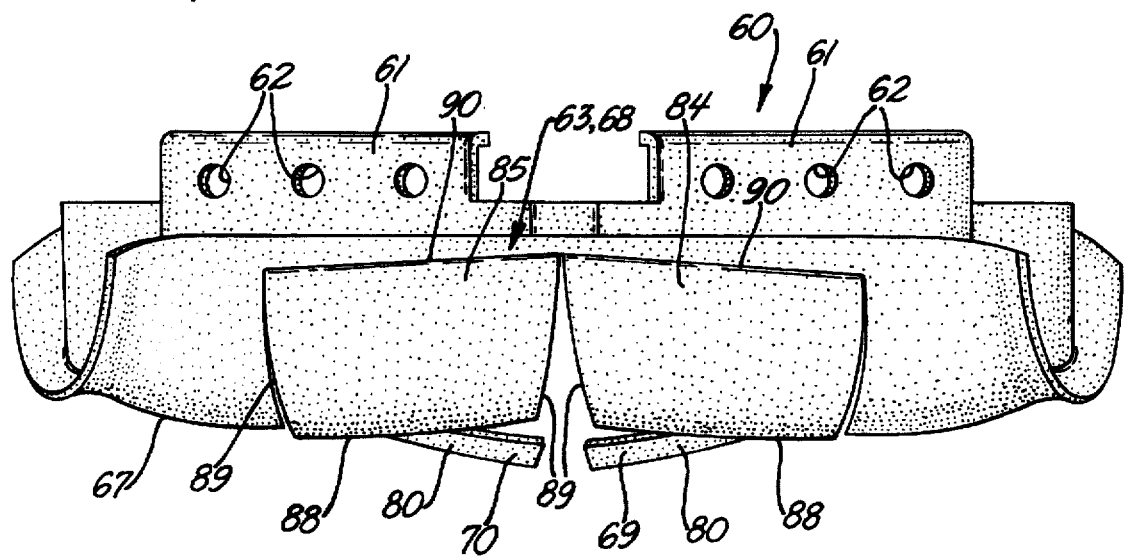
FIG. 7 is a first side view of the cover in the partially open condition and viewed in the direction of line 7—7 of FIG. 6.
Figure 8:
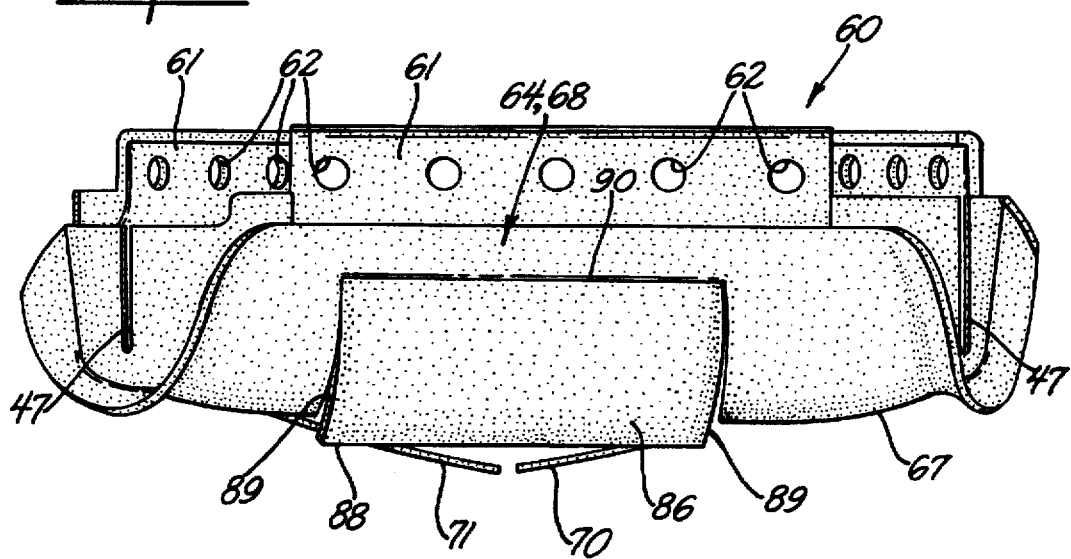
FIG. 8 is a second side view of the cover in the partially open condition and viewed in the direction of line 8—8 of FIG. 6.

In addition, the air bag module 40 includes an air bag cover 60 attached to the base plate or the vehicle steering wheel 12 in a suitable manner, such as by fasteners (not shown) extending through flange apertures 62 in downwardly extending flanges 61 of the cover 60 as best shown in FIGS. 7 and 8. The cover 60 is preferably integrally molded of a single layer of plastic material and thus is relatively easy to manufacture. However, it will be appreciated that the cover 60 could also be comprised of more than one layer and could include an outer decorative cover layer, such as a urethane foam material. The cover 60 overlies the air bag and inflator and maintains the air bag in a folded condition prior to air bag deployment.

Referring to FIG. 1, the cover 60 and the module 40 each preferably have a generally triangular shape with a first edge portion 63 extending between the first and second spoke portions 15, 16, a second edge portion 64 extending between the second and third spoke portions 16, 17 and a third edge portion 65 extending between the third and first spoke portions 17, 15. It will be appreciated that the three edge portions 63, 64, 65, of the triangular cover 60 extending between the three spoke portions 15, 16, 17 need not be exactly straight, but may have slight bends or curvature therein. The cover 60 includes a generally planar top surface 67 and generally vertical side portions 68 extending downwardly from the top surface 67 and generally between each of the spoke portions 15, 16 and 17.

Figure 2:
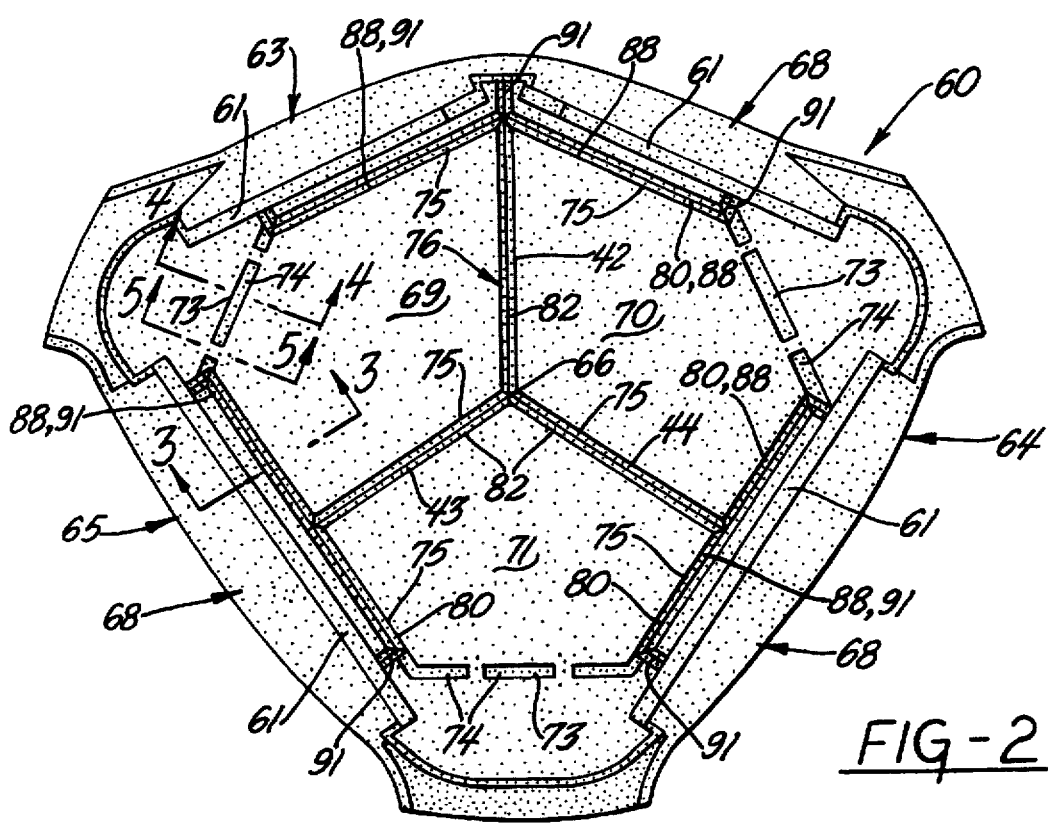
FIG. 2 is a bottom view of the air bag cover only of FIG. 1 in an unbroken, closed condition prior to air bag deployment.
Figure 4:
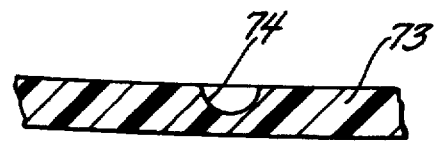
FIG. 4 is a sectional view taken along line 4—4 of FIG. 2.
Figure 5:
FIG. 5 is a sectional view taken along line 5—5 of FIG. 2.
Figure 6:
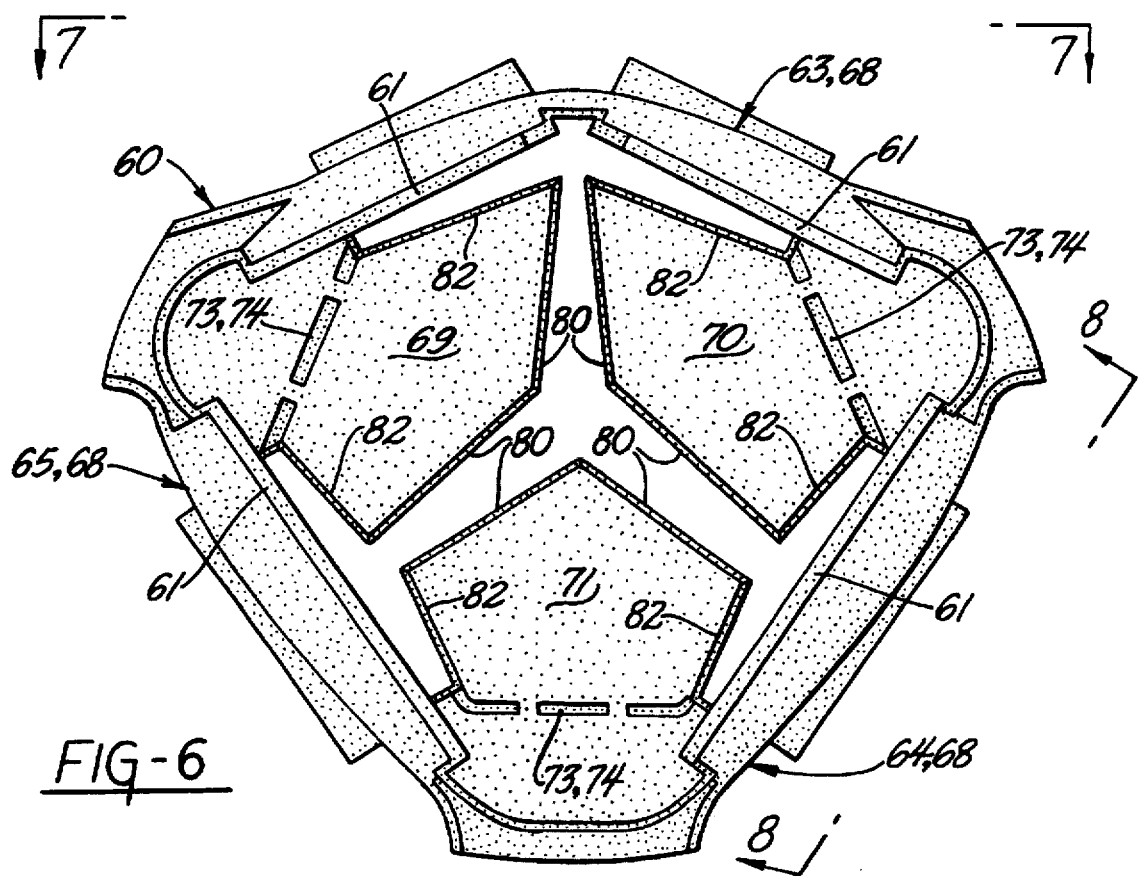
FIG. 6 is a bottom view of the air bag cover similar to FIG. 2, but showing the air bag cover in a partially open condition after air bag deployment.

As best shown in FIGS. 1, 2 and 6, the cover 60 includes first second and third primary flap portions 69, 70, 71, respectively, which are each radially aligned with the first, second, and third spoke portions 15, 16 17, respectively. The primary flap portions 69, 70, 71 are located on the generally planar top surface 67 of the cover 60. The primary flap portions 69, 70, 71 each include a base edge 73 located adjacent and radially aligned with the respective spoke portions 15, 16, 17. The base edges 73 are bendable such that the primary flap portions 69, 70, 71 are hinged open about the base edges 73 which remain attached to the cover 40 during air bag deployment. Preferably, the base edges 73 are partially weakened to enable bending movement to hinge the primary flap portions 69, 70, 71 open as shown in FIG. 2. Accordingly, the base edges 73 include solid sections as shown in FIG. 5 and are partially weakened such as by including thinned sections 74 preferably in a generally circular shape as shown in FIG. 4. Thus, upon air bag deployment, the primary flap portions 69, 70, 71 pivot open about the base edges 73 to permit deployment of the air bag through the cover 60. It will be appreciated that each of the base edges 73 of the primary flap portions 69, 70, 71 are preferably radially aligned with each of the spoke portions 15, 16, 17 such that secondary flap portions 84, 85, 86, 87 are positioned between the primary flap portions 69, 70, 71 and also between the spoke portions 15, 16, 17 as described further hereinafter.

Figure 3:
FIG. 3 is a sectional view taken along line 3—3 of FIG. 2.

Referring to FIGS. 1, 2 and 6, the primary flap portions 69, 70, 71 each include a first pair of side edges 80 which extend radially inward from the base edges 73 and which diverge away from each other. The primary flap portions 69, 70, 71 each also include a second pair of side edges 82 extending radially inward towards a generally central point 66 on the cover 60 and which converge towards each other and intersect each other at the generally central point 66 on the cover 60. As best shown in FIGS. 1, 2 and 6, it will be appreciated that each of the primary flap portions 69, 70, 71 preferably has a generally pentagonal shape with the five edges of the pentagon formed by the base edges 73 and the first and second pair of side edges 80, 82. Each of the pairs of side edges 80, 82 are breakable upon the force of air bag inflation. Preferably, the side edges 80, 82 include weakened portions 75 preferably defining continuous V-shaped notches which provide thinned sections of material as best shown in FIG. 3. However, it will be appreciated that the weakened portions 75 defining the breakable pairs of side edges 80, 82 of the primary flap portions 69, 70, 71 may be of any suitable configuration for enabling breakage along the pairs of side edges 80, 82 during air bag deployment, such as discontinuously thinned sections or slotted sections. The second pair of side edges 82 each are preferably positioned between the respective spoke portions 15, 16, 17 on opposing sides of the base edges 73.

The primary flap portions 69, 70, 71 each have independent diverging pairs of first side edges 80 which are not shared between the primary flap portions 69, 70, 71 but which are shared with the secondary flap portions 84, 85, 86, 87. The primary flap portions 69, 70, 71 each share the converging second pairs of side edges 82 between each other. Preferably, the shared second pairs of side edges 82 of the primary flap portions 69, 70, 71 cooperatively define first, second, and third weakened portions 42, 43, 44. The first, second, and third weakened portions 42, 43, 44 cooperatively define a single Y-shaped tear pattern 76 which is generally centered on the air bag cover 60 and which substantially covers the top surface 67 of the cover 60. The first, second, and third weakened portions 42, 43, 44 converge at the central point 66 on the cover 60.

As best shown in FIGS. 1, 7 and 8, the cover 60 further includes first, second, third, and fourth secondary flap portions 84, 85, 86, 87. The secondary flap portions 84, 85, 86, 87 are each substantially located on the downwardly extending side portions 68 of the cover 60. The secondary flap portions 84, 85, 86, 87 each include an upper edge 88 on the top surface 67 and opposing side edges 89 which extend vertically downward from the upper edges 88. Each of the secondary flap portions 84, 85, 86, 87 includes a hinged edge 90 extending between the side edges 89. Upon air bag deployment the secondary flap portions 84, 85, 86, 87 rotate open about the hinged edges 90. The upper edges 88 and side edges 89 each include weakened portions 91 preferably being V-shaped notches as shown with respect to the weakened portions 75 of the primary flap portions 69, 70, 71 in FIG. 3. The secondary flap portions 84, 85, 86, 87 each preferably have a generally quadrangular shape.

At least one of the secondary flap portions 84, 85, 86, 87 is positioned between each of the spoke portions 15, 16, 17 and between each of the base edges 73 of the primary flap portions 69, 70, 71. The first and second secondary flap portions 84, 85 are both positioned between the first and second spoke portions 15, 16 along the longer first edge portion 63 of the cover 60. The third secondary flap portion 86 is positioned between the second and third spoke portions 16, 17 and the fourth secondary flap portion 87 is positioned between the third and first spoke portions 17, 15. As shown in FIG. 8, the cover 60 may further include slits 47 to assist with assembly of the cover 60 to the base plate and hub portion 14 of the steering wheel 12.

To provide the vehicle steering wheel and air bag module assembly 10, the complete air bag module 40 preferably including the air bag, the inflator, the base plate and the cover 60 is assembled in overlying relationship to the hub portion 14 of the steering wheel 12 in a suitable manner, such as by fasteners (not shown) which extend upwardly through the hub portion 14 and are secured to the base plate. In the assembled condition prior to deployment as shown in FIG. 1, the cover 60 maintains the air bag in the folded condition and provides an aesthetically pleasing cover for the air bag module 40. It will also be appreciated that while the cover 60 is preferably mounted to the base plate, the cover 60 could alternately be mounted to the steering wheel 12, such as at the hub portion 14. It will be appreciated that each of the primary flap portions 69, 70, 71 and each of the secondary flap portions 84, 85, 86, 87 is in an unbroken, closed condition prior to air bag deployment as best shown in FIGS. 1 and 2. Prior to air bag deployment the weakened portions 42, 43, 44, 75 of the primary flap portions 69, 70, 17 and the weakened portions 91 of the secondary flap portions 91 remain unbroken. Also, the upper edges 88 of the secondary flap portions 84, 85, 86, 87 are connected with the first pairs of side edges 80 on the primary flap portions 69, 70, 71.

Upon sensing a predetermined vehicle condition, the inflator generates gas to inflate the air bag which breaks open the weakened portions 42, 43, 44 forming the Y-shaped tear pattern 76, the weakened portions 75 on the breakable first and second pairs of side edges 80, 82 of the primary flap portions 69, 70, 71, and the weakened portions 91 of the secondary flap portions 91 enabling the air bag to deploy out through the cover 60 and rearward towards a vehicle occupant. It will be appreciated that the primary flap portions 69, 71, 71 which bend open about the base edges 73 and the Y-shaped tear pattern 76 advantageously provide an enlarged opening on the top surface 67 of the cover 60 through which the air bag can deploy rearward towards the vehicle occupant. In addition, the secondary flap portions 84, 85, 86, 87 advantageously provide openings in the side portions 68 of the cover 60 which permit easier outward lateral expansion of the air bag during inflation. Thus, the combination of the primary flap portions 69, 70, 71 and the secondary flap portions 84, 85, 86, 87 advantageously provide an enlarged opening through which the air bag can expand both rearwardly and laterally during air bag inflation. In addition, the use of three primary flap portions 69, 70, 71 having base edges 73 radially aligned with the spoke portions 15, 16 and 17 takes full advantage of the triangular shape of the cover 60 for providing the opening on the top surface 67. In addition, the Y-shaped tear pattern 76 substantially covering the top surface 67 also complements the triangular shape of the cover 60 to provide an enlarged opening. In addition, the secondary flap portions 84, 85, 86, 87 located between the spoke portion 15, 16, 17 and the base edges 73 of the primary flap portions 69, 70, 71 also complement the shape of the triangular cover 60 for increasing lateral expansion of the air bag during inflation.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A vehicle steering wheel and air bag module assembly, the assembly including an inflatable air bag for deployment, the assembly comprising:

a steering wheel having a hub portion and a rim portion and a plurality of spoke portions connecting the hub portion to the rim portion; and an air bag module mounted to the hub portion and including an air bag cover having a generally planar top surface and generally vertical side portions extending generally downward from the top surface, the air bag cover including a plurality of primary flap portions located substantially on the top surface and a plurality of secondary flap portions located substantially on the side portions, the primary and secondary flap portions being movable from a closed condition to an open condition upon air bag inflation.

2. The assembly of claim 1 wherein the primary flap portions each include a base edge about which the primary flap portions are hinged open during air bag inflation and include weakened portions which cooperatively form a Y-shaped tear pattern on the top surface of the air bag cover and wherein the top surface of the cover includes a generally central point thereon and wherein the weakened portions forming the Y-shaped tear pattern converge to intersect at the generally center point.

3. The air bag assembly of claim 1 wherein the secondary flap portions are positioned between the respective spoke portions.

4. The assembly of claim 1 wherein the steering wheel includes an equal number of spoke portions and primary flap portions and wherein the primary flap portions each include a base edge about which the flap portions hinge open, the base edges each being radially aligned with the respective spoke portions.

5. The assembly of claim 1 wherein each of the primary flap portions includes a base edge about which the primary flap portions hinge open and wherein the secondary flap portions are each positioned between the base edges of the primary flap portions.

6. The assembly of claim 1 wherein the cover includes exactly three primary flap portions.

7. The assembly of claim 1 wherein the steering wheel includes exactly three spoke portions and wherein at least one secondary flap portion is located between each of the spoke portions.

8. The assembly of claim 7 wherein the cover includes exactly three primary flap portions.

9. The assembly of claim 8 wherein the primary flap portions each include a base edge about which the flap portions hinge open, the base edges each being adjacent and radially aligned with the respective spoke portions.

10. The assembly of claim 1 wherein the cover has a generally triangular shape.

11. The assembly of claim 1 wherein the primary flap portions each have a generally pentagonal shape.

12. The assembly of claim 1 wherein the primary flap portions each include a base edge about which the primary flap portions pivot open and wherein each of the primary flap portions include a first pair of breakable side edges extending away from the base edges and diverging away from each other and wherein each of the primary flap portions includes a second pair of breakable side edges extending away from the first pair of side edges and converging towards each other and wherein the cover has a generally central point at which the second pairs of side edges intersect.

* * * * *